United States Patent [19]
Aharon

[11] Patent Number: 4,532,916
[45] Date of Patent: Aug. 6, 1985

[54] LINEAR CONCENTRATING SOLAR COLLECTOR

[76] Inventor: Naaman B. Aharon, P.O.B. 1016, Beer Sheva 84110, Israel

[21] Appl. No.: 473,203

[22] Filed: Mar. 8, 1983

[30] Foreign Application Priority Data

Mar. 14, 1982 [IL] Israel .................................. 65238

[51] Int. Cl.³ .................................................. F24J 3/02
[52] U.S. Cl. ...................................... 126/424; 126/438; 126/451; 350/614; 350/628
[58] Field of Search ............... 126/424, 438, 451, 425; 350/288, 289, 292, 293, 294, 299, 310

[56] References Cited

U.S. PATENT DOCUMENTS

| | | | |
|---|---|---|---|
| 1,951,404 | 3/1934 | Goddard | 126/438 X |
| 4,083,357 | 4/1978 | Fischer | 126/438 X |
| 4,148,564 | 4/1979 | Devin et al. | 350/292 |
| 4,243,019 | 1/1981 | Severson | 126/438 |
| 4,249,514 | 2/1981 | Jones | 126/438 |
| 4,262,660 | 4/1981 | Ilich | 126/451 |
| 4,321,909 | 3/1982 | Trihey | 126/438 X |
| 4,326,773 | 4/1982 | Colas | 350/292 |
| 4,359,041 | 11/1982 | Snodgrass | 126/424 |
| 4,372,027 | 2/1983 | Hutchison | 350/293 X |
| 4,386,600 | 6/1983 | Eggert | 126/438 |
| 4,416,263 | 11/1983 | Niedermeyer | 126/438 |

FOREIGN PATENT DOCUMENTS

2511740  9/1976  Fed. Rep. of Germany ...... 126/438

*Primary Examiner*—Margaret A. Focarino
*Attorney, Agent, or Firm*—Birch, Stewart, Kolasch & Birch

[57] ABSTRACT

The present invention relates to a segment of a linear concentrating solar collector which includes two plates distanced from each other and extending parallel to each other; a member connects the plates to each other and holes are bored in each of the plates in a parallel manner along a parabolic curve. A member passes through the holes each holding a small strip made of a reflecting material all strips together forming a parabolic surface. The invention relates also to a collector comprising at least two of each segments and an absorber extending along the focus line of the entire collector. The collector is advantageously provided with horizontal and/or vertical members which ascertains that the collector can follow the position of the sun.

5 Claims, 8 Drawing Figures

LINEAR CONCENTRATING SOLAR COLLECTOR

BACKGROUND OF THE INVENTION

The present invention relates to a linear concentrating solar collector.

There exist many kinds of solar collectors. They may be divided generally into two:

a. Those achieving temperature up to 100° C. which are used in particular to obtain hot water for domestic purposes. For this purpose there exist many collectors, mainly static, flat ones which are quite cheap. However, these solar heaters are not satisfactory as one cannot achieve temperatures of more than 100° C. which is required for many industrial purposes, e.g., for obtaining steam.

b. Concentrating collectors which achieve temperatures higher than 100° C. and for this reason must follow the position of the sun. This kind of collector has so far not been sufficiently developed as it requires relatively big units which are expensive and can be adjusted only with difficulty.

There is known one concentrating collector wherein the reflecting surface has the shape of a parabola. However, thus unit is not satisfactory as it is rather difficult to manufacture and transport such large parabolic surface. Moreover, it is very difficult to adjust it in such a manner that the absorber, i.e., the part being heated by the reflecting rays is extending exactly in the focus of said parabola. It is readily understood that the moment the collector is not adjusted properly the entire device will not work satisfactorily.

SUMMARY AND OBJECTS OF THE INVENTION

It has therefore been desirable to devise a concentrating collector which overcomes the above drawbacks, i.e., one which achieves working temperatures of more than 100° C. and a rather high efficiency, which is easy to manufacture and to transport and can be adjusted easily in a precise manner.

It has now been found that the above purpose can be achieved by a solar collector which consists of several segments, in which the reflecting surface is made of many individual adhering strips which together form a parabolic surface.

The present invention thus consists in a segment of a linear concentrating solar collector which comprises:

a. two plates distanced from each other extending parallel to each other;

b. means connecting said plates to each other;

c. holes bored at each of said plates in an exactly parallel manner along a suitable parabolic curve; and, d. means passing through said holes each holding a small strip made of reflecting material all strips forming together a parabolic surface.

The plates are made of any suitable material, e.g., polyester, but are preferably made of tin. The length of each plate is preferably about 1-3 m and the distance between said two plates is preferably about 50-100 cm.

Plates in connection with the present invention mean any side walls extending along both sides of the device. They may be plates having any suitable form, i.e., be rectangular, parabolic, V-shaped, etc. They may also be formed and strengthened in a profile-like manner, e.g., may constitute a U- or T-like profile. They may be formed by one or more parts.

The means connecting said plates (hereinafter "connecting means") are advantageously plates, rods, pipes or the like, connecting one plate to the other. In a preferred embodiment of the segment according to the present invention there are connected in a rigid manner at the center of said plates means extending perpendicularly to said plates (hereinafter "perpendicular means"). Said perpendicular means are connected by means (hereinafter "horizontal means"). Both the perpendicular and the horizontal means are any suitable plates, rods, pipes or the like. The connecting means as well as the perpendicular and horizontal means ascertain that a rigid construction is achieved.

The perpendicular means serve also the following additional purposes:

a. the horizontal axis of means regulating the vertical movement of the segment and/or the collector may pass through same advantageously at the center of gravity; and, b. the absorber which should absorb the rays reflecting from the collector may pass said perpendicular means in such a manner that it extends along the focus line of said collector. The fluid, e.g., water to be heated, flows within said absorber.

The holes should be bored in a precise manner along the parabolic curve so that the final reflecting surface has substantially the form of a parabola the focus of which is said absorber.

The strips advantageously have the width of 10-40 mm. They may be made of any suitable reflecting material, e.g., glass, certain plastics optionally covered by a reflecting metal, polished aluminum, etc.

As means for holding said strips there may be utilized any suitable means, e.g., rods with a slit closed by a nut, etc.

The strips may be adjusted easily, e.g., with the help of laser beams so that the focus of the collector substantially coincides with the position of the absorber.

The entire segment may be, if desired, covered from all sides besides that pointing towards the sun with a suitable insulating material.

It is readily understood that whereas the above segment may serve as a collector on its own in which case it is provided with an absorber extending along the focus line of said collector and advantageously with means ascertaining that the collector follows the sun in a horizontal and/or vertical manner. However, in order not to make the segment too large the solar collector according to the present invention will usually be constituted by a number of said segments.

The present invention thus consists also in a solar collector comprising at least two segments being suitably connected to each other and an absorber extending along the focus line of the entire collector.

The number of segments is chosen according to the requirements of the customer. It may be relatively large as long as the movement of the collector can be regulated along the horizontal and/or vertical axis.

The segments are connected to each other by any suitable means. In a preferred embodiment holes are bored along the plates of the segments through which are passed screws, nails or any other suitable means.

The collector according to the present invention is preferably provided with horizontal and/or vertical means which ascertain that the collector can follow the position of the sun all the time. For this purpose any suitable device can be utilized, e.g., that described and claimed in U.S. Pat. No. 4,345,582.

It is readily understood that the segment and/or the collector according to the present invention overcomes most of the above drawbacks. The segment is a relatively small, light unit which may be handled, stored and transported without any difficulty. There is certainly no need to transport an entire collector as the segments can be connected easily at the site of use.

Moreover, as the various parts of the segments can be assembled easily in many instances the various parts will be stored and transported separately and the entire device will be assembled at the site where the collector is to be erected.

Finally, as the strips can be adjusted easily a collector with a high efficiency is achieved.

BRIEF DESCRIPTION OF THE DRAWINGS

The present invention will now be illustrated with reference to the accompanying drawings without being restricted by them. (The same parts are marked by identical numerals). In said drawings.

DETAILED DESCRIPTION OF THE INVENTION

Figure 1:
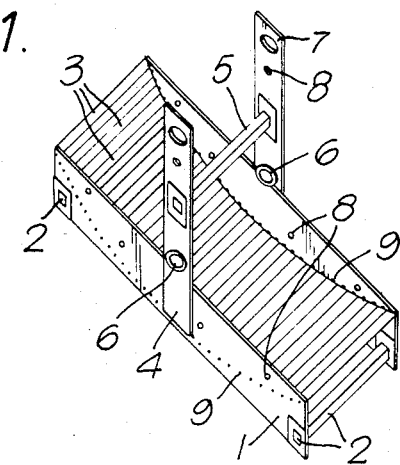
FIG. 1 shows a perspective view of a segment according to the present invention.
Figure 2:
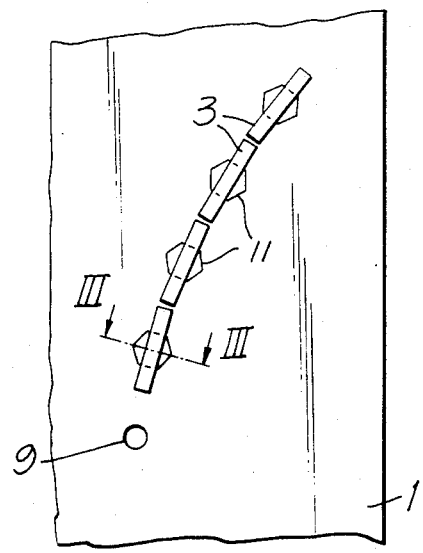
FIG. 2 shows a partial section along the side of plate 1 in FIG. 1.
Figure 3:
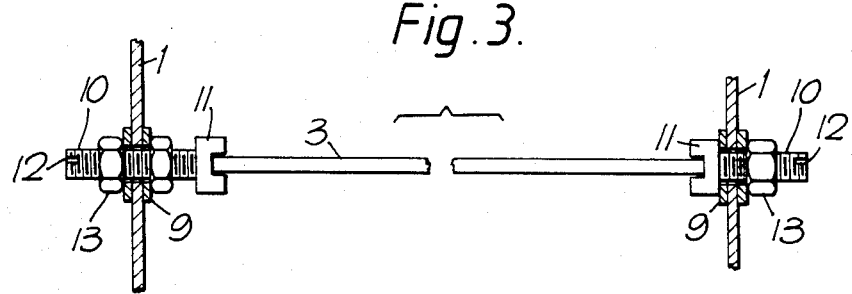
FIG. 3 shows a section along line III—III of FIG. 2.

The segment shown in FIGS. 1 to 3 (hereinafter called "segment") comprises two parallel plates 1 which are connected to each other by way of rods 2 (connecting means). Between plates 1 are placed strips 3 made of a reflecting material. At the center of each of plates 1 are connected perpendicularly extending plates 4 (perpendicular means) which are connected to each other by rods 5 (horizontal means).

Figure 2A:
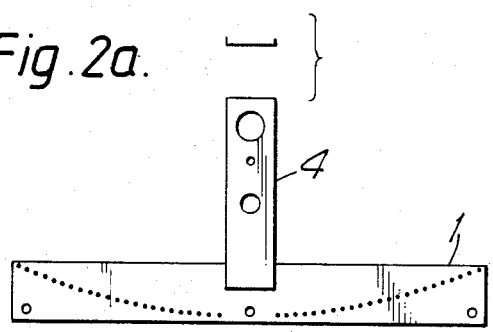
FIGS. 2a–2c show side views of various segments according to the present invention.
Figure 2B:
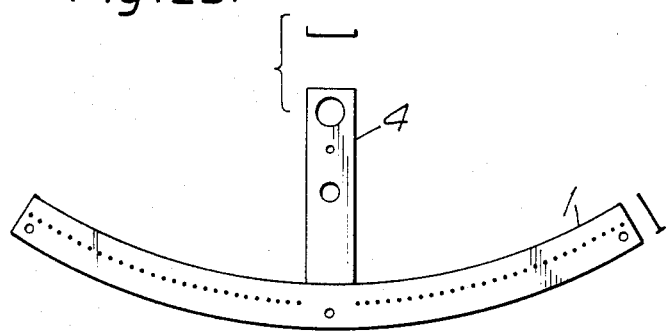
Figure 2C:
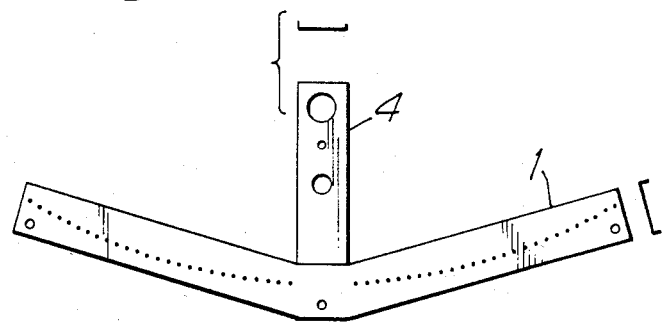

FIGS. 2a–c show plates having various forms. FIG. 2a shows a straight rectangular plate. FIG. 2b shows a parabolic plate strengthened in such a manner that it is a T-profile. FIG. 2c has a V-shaped form and constitutes a U-profile.

On plates 4 are arranged:

a. bearing means 6 through which passes the axle of the means regulating the vertical movement of the segment; and, b. bearing means 7 through which the absorber passes.

The absorber is so arranged that it constitutes the focus line of the collector.

Along plates 1 are bored at pre-determined distances, parallel to each other, holes 8 by which one segment can be connected to the adjacent one.

On each of plates 1 are bored holes 9 exactly parallel to each other along a suitable parabolic curve.

Through each of holes 9 is passed rod 10 which at its head has slit 11 into which is rigidly inserted strip 3. At the end of each rod 10 is another slit 12 by which rod 10 can be rotated to adjust strips 3 so that the focus of the collector substantially coincides with the axis of the absorber. Adjusting nut 13 fixes rod 10 in the final position. (Advantageously at least one of rods 10 holding a strip 3 is provided with two nuts 13).

Figure 4:
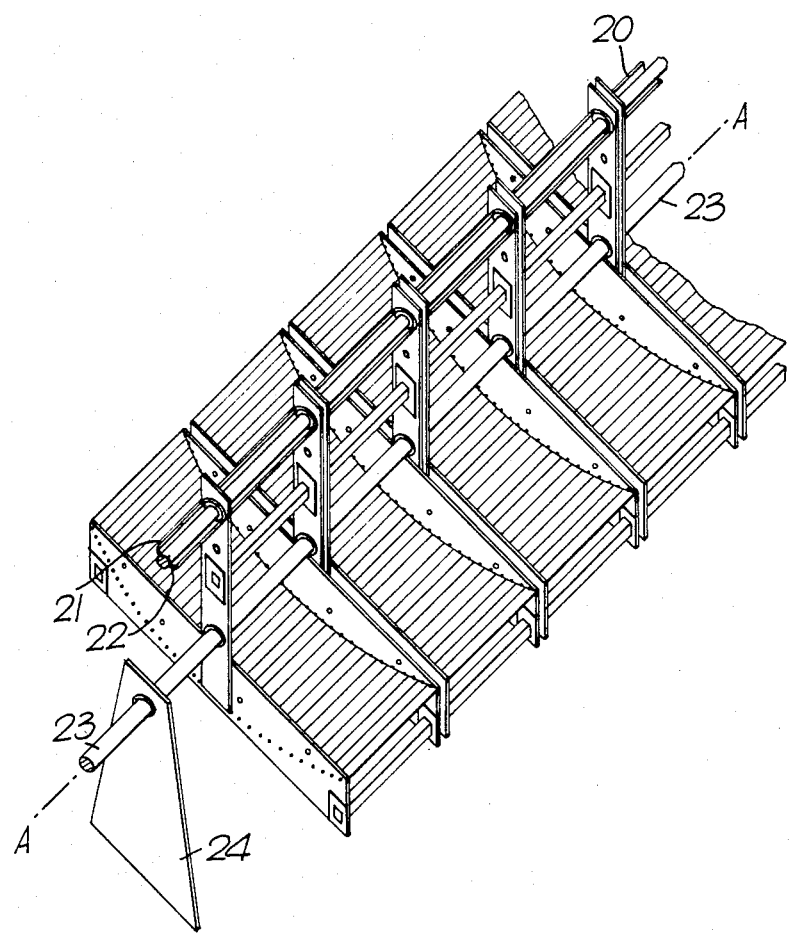
FIG. 4 shows a collector made of some segments as shown in FIGS. 1 to 3.

The collector illustrated in FIG. 4 is made of several segments. Through bearing means 7 of plates 4 extends absorber 20. Absorber 20 consists of two parts, namely:

Glass pipe 21 which is tightly sealed and advantageously has a high vacuum;

Within glass pipe 21 extends metal pipe 22 which receives the rays reflected from strip 3. Within pipe 22 flows the fluid to be heated.

Absorber 20 is in general common to the entire collector and not a specific part of each segment. It can be inserted easily through and fixed by bearing means 7.

The absorber has inlet and outlet means (not shown) to be connected in a simple manner to the source of the cold fluid and to the recipient of the hot fluid, respectively.

Through bearing means 6 of plates 4 passes axle 23 around which the entire collector rotates (axis A—A) while following the movement of the sun. Said axle 23 is also in general common to the entire collector. It is advantageously arranged at the center of gravity of the segments and it also ascertains that the several segments are connected to each other in a precise manner constituting a linear concentrating solar collector. Axle 23 is held by at least two bases 24. (The actuating means of axle 23 are not shown).

Figure 5:
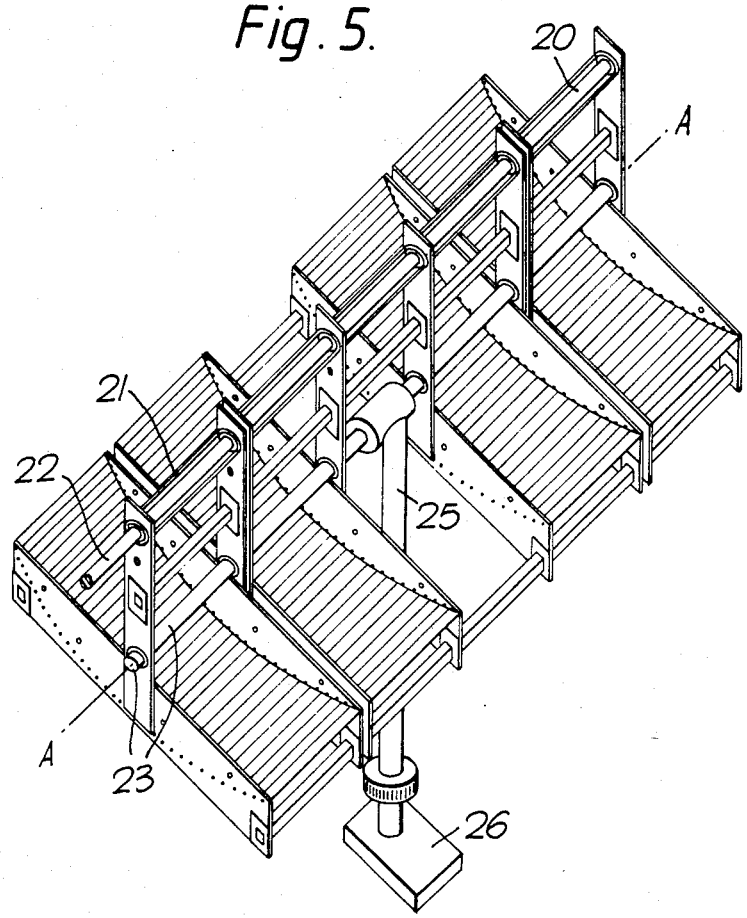
FIG. 5 shows another embodiment of a collector made of some segments as shown in FIGS. 1 to 3.

The collector illustrated in FIG. 5 differs from that illustrated in FIG. 4 in that it enables also a horizontal movement of the collector when following the movement of the sun (azimuth). Said horizontal movement increases the efficiency of the collector. In this collector the vertical movement is ascertained by vertical axle 25 around axis B. Said axle 25 is mounted on base 26. Axle 25 is connected in a rigid manner to the center of axle 23. At both sides of axle 25 there are connected in a symmetrical manner segments. (The actuating means of axles 25 are also not shown).

The collectors illustrated in FIGS. 4 and 5 will in general be assembled at the site of use. The several modular segments are connected to each other by way of means passing holes 8. Collector 20 is inserted and the inlets and outlet connected to the source of the cold fluid and the recipient of the hot fluid respectively. Axles 23 and 25 (if present) are put at their predetermined places and connected to their respective actuating means.

As mentioned above, the segments may also be assembled at the site of use. In this case plates 1 and 4, strips 3 and means 2 and 5 as well as rods 10 and nuts 13 or some of same will be brought as separate parts and assembled at said site. The adjustment of the strips may be performed as mentioned above in a very simple manner.

I claim:

1. A segment of a linear concentrating solar collector comprising:

two plates spaced apart a predetermined distance with respect to each other and extending substantially in parallel relative to each other;

a connecting member operatively retaining said plates in said spaced apart relationship;

a plurality of holes positioned in each of said plates for defining a shape of a parabolic curve;

a plurality of reflective strips being operatively positioned between said plates and being disposed adjacent to each other to extend along said parabolic curve;

an absorber being operatively positioned at substantially an axial focal line of said parabolic curve;

adjustment means for individually adjusting each of said reflective strips for linearly focusing incident solar rays to coincide with said focal line of said absorber.

2. A segment of a linear concentrating solar collector according to claim 1, wherein said adjustment means is a rod projecting through each of said holes in said plates and including a slit for imparting motion to said rod for adjusting said reflective strip.

3. A segment of a linear concentrating solar collector according to claim 2, and further including a locking nut threaded to said rod for retaining the relative position of said rod after adjustment.

4. A segment of a linear concentrating solar collector according to claim 1, wherein said connecting member and said absorber are spaced a predetermined distance relative to each other and are disposed on distinct planes.

5. Segment according to claim 1, comprising at the center of gravity of each of said plates the axle of means regulating the vertical movement of the segment and/or the collector.

* * * * *